US012625504B2

(12) United States Patent
Pan et al.

(10) Patent No.: US 12,625,504 B2
(45) Date of Patent: May 12, 2026

(54) AUTONOMOUS MOBILE DEVICE AND CONTROL METHOD THEREOF

(71) Applicant: FAROBOT INC., New Taipei City (TW)

(72) Inventors: Sheng-Kai Pan, New Taipei City (TW); Yi-Cheng Jiang, New Taipei City (TW); Yu-Jun Huang, New Taipei City (TW)

(73) Assignee: FAROBOT INC., New Taipei City (TW)

( * ) Notice: Subject to any disclaimer, the term of this patent is extended or adjusted under 35 U.S.C. 154(b) by 143 days.

(21) Appl. No.: 18/439,770

(22) Filed: Feb. 13, 2024

(65) Prior Publication Data

US 2025/0216862 A1 Jul. 3, 2025

(30) Foreign Application Priority Data

Dec. 28, 2023 (CN) .......................... 202311842073.0

(51) Int. Cl.
| | |
|---|---|
| *G05D 1/646* | (2024.01) |
| *G05D 1/24* | (2024.01) |
| *G05D 1/43* | (2024.01) |

(52) U.S. Cl.
CPC ............... *G05D 1/646* (2024.01); *G05D 1/24* (2024.01); *G05D 1/43* (2024.01)

(58) Field of Classification Search
CPC ........... G05D 1/646; G05D 1/24; G05D 1/43; G05D 1/617; G05D 1/686; G01C 21/00
See application file for complete search history.

(56) References Cited

U.S. PATENT DOCUMENTS

| | | | | |
|---|---|---|---|---|
| 11,884,268 | B2 * | 1/2024 | Seegmiller | ........ B60W 30/0956 |
| 2006/0037528 | A1 * | 2/2006 | Farritor | .................. E01F 9/688 |
| | | | | 116/200 |
| 2012/0283909 | A1 * | 11/2012 | Dix | ..................... G05D 1/0225 |
| | | | | 701/41 |
| 2017/0293304 | A1 * | 10/2017 | Dang | .................. B62D 15/029 |
| 2019/0251373 | A1 * | 8/2019 | Lee | ................... G01C 21/3658 |
| 2020/0166350 | A1 * | 5/2020 | Gitz | ..................... G01C 21/367 |
| 2021/0053555 | A1 * | 2/2021 | Sugiyama | ............ G05D 1/0022 |
| 2021/0278852 | A1 * | 9/2021 | Urtasun | .............. G05D 1/0214 |

FOREIGN PATENT DOCUMENTS

| | | |
|---|---|---|
| CN | 114167860 A | 3/2022 |
| CN | 116300871 A | 6/2023 |
| TW | 202206957 A | 2/2022 |

* cited by examiner

*Primary Examiner* — Dale W Hilgendorf
*Assistant Examiner* — Frank T Glenn, III
(74) *Attorney, Agent, or Firm* — ScienBiziP, P.C.

(57) ABSTRACT

The present disclosure provides a control method for an autonomous mobile device. The control method includes obtaining a pose of a target point; determining motion control parameters based on the pose of the target point; and controlling, according to the motion control parameters, the autonomous mobile device to move along a motion trajectory. A path curvature of the motion trajectory includes an inverse proportional function of a distance from the autonomous mobile device to the target point. A coefficient of the inverse proportional function includes a term that is functionally related to a lateral offset between the autonomous mobile device and the target point, where the lateral offset is associated with an orientation of the target point.

16 Claims, 4 Drawing Sheets

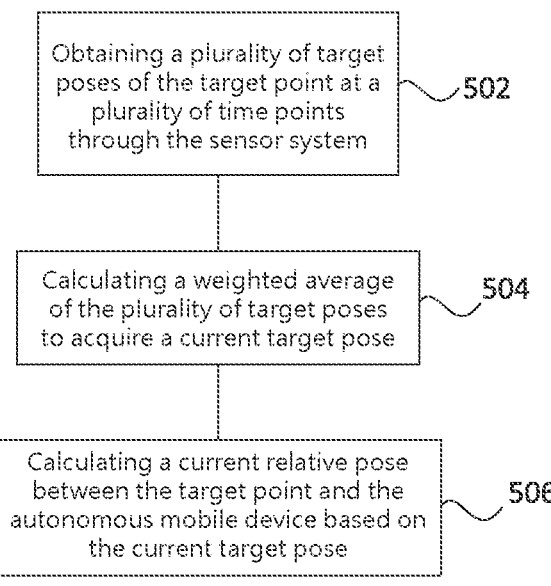

Obtaining a plurality of target poses of the target point at a plurality of time points through the sensor system ~502

Calculating a weighted average of the plurality of target poses to acquire a current target pose ~504

Calculating a current relative pose between the target point and the autonomous mobile device based on the current target pose ~506

FIG.5

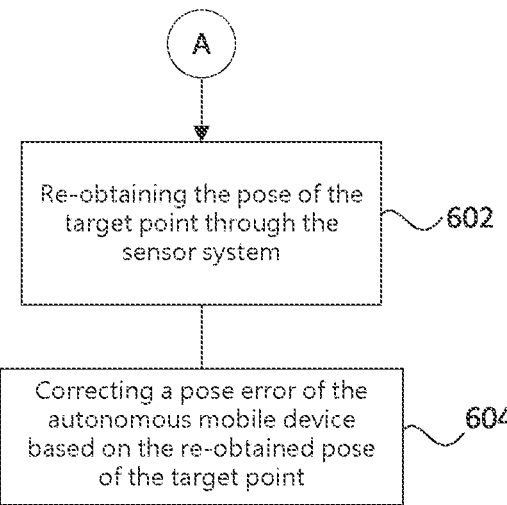

A

Re-obtaining the pose of the target point through the sensor system ~602

Correcting a pose error of the autonomous mobile device based on the re-obtained pose of the target point ~604

FIG.6

AUTONOMOUS MOBILE DEVICE AND CONTROL METHOD THEREOF

CROSS-REFERENCE TO RELATED APPLICATION

The present application claims the benefit of and priority to China Patent Application No. 202311842073.0, filed on Dec. 28, 2023, the contents of which are hereby fully incorporated herein by reference for all purposes.

FIELD

The present disclosure generally relates to automatic control technology and, more particularly, to an autonomous mobile device and its control method during docking stages.

BACKGROUND

Autonomous mobile units play a crucial role in various fields, such as automated manufacturing, robot navigation, precision medical devices, and unmanned transportation systems. However, current autonomous mobile units face numerous unresolved problems in alignment control (e.g., docking control).

One of the problems arises from the algorithms. Specifically, the motion control systems of general autonomous mobile units often use more basic path planning algorithms that may not fully consider the environmental and operational requirements during the docking stage. Therefore, when these path planning algorithms are applied to the docking stage, unnecessary adjustments and corrections may be required, thus affecting the smoothness and efficiency of the docking process.

Another problem arises from the stability of the sensors. The stability of the sensors is particularly crucial when making subtle adjustments and achieving precise alignment. If the sensor data exhibits significant fluctuations or drift, not only will the drift/fluctuation affects the smoothness and accuracy of the alignment but may also impact the overall reliability and safety of the system.

Therefore, there is room for improvement, which includes a method for controlling autonomous mobile units to enable smoother and more precise alignment operations such as docking.

SUMMARY

In view of the above, the present disclosure provides a control method for an autonomous mobile device that can quickly correct the lateral offset between itself and the target point, thus enhancing the smoothness and efficiency of alignment between the autonomous mobile device and the target point.

A first aspect of the present disclosure provides a control method for an autonomous mobile device. The method includes: obtaining a pose of a target point; determining a motion control parameter based on the pose of the target point; and controlling the autonomous mobile device to move along a motion trajectory according to multiple motion control parameters including the motion control parameter. A path curvature of the motion trajectory includes an inverse proportional function of a distance between the autonomous mobile device and the target point. A coefficient of the inverse proportional function includes a term which is functionally related to a lateral offset between the autonomous mobile device and the target point, and the lateral offset is associated with an orientation of the target point.

In some implementations of the first aspect, the lateral offset is further associated with a position of the autonomous mobile device.

In some implementations of the first aspect, the obtaining of the pose of the target point includes: obtaining multiple target poses of the target point at multiple time points through a sensor system; calculating a weighted average of the multiple target poses to obtain a current target pose; and calculating a current relative pose between the target point and the autonomous mobile device based on the current target pose.

In some implementations of the first aspect, the obtaining of the multiple target poses of the target point at multiple time points through a sensor system includes: detecting the target point through the sensor system to obtain a sensing result; and transforming the sensing result into an odometry coordinate system to obtain one of the target poses.

In some implementations of the first aspect, the method further includes: detecting a motion of the autonomous mobile device through the sensor system; calculating a current device pose of the autonomous mobile device in the odometry coordinate system based on the motion; and calculating a current relative pose between the target point and the autonomous mobile device based on the current target pose and the current device pose.

In some implementations of the first aspect, the multiple target poses at multiple time points include a first target pose at a first time point, the first target pose is detected and obtained by a camera on the autonomous mobile device, and a weight corresponding to the first target pose is negatively correlated with a velocity of the autonomous mobile device at the first time point.

In some implementations of the first aspect, the multiple target poses at multiple time points include a first target pose at a first time point, the first target pose is detected and obtained by an optical radar on the autonomous mobile device, and a weight corresponding to the first target pose is negatively correlated with a distance between the target point and the autonomous mobile device.

In some implementations of the first aspect, the method further including: determining a pose difference between the autonomous mobile device and the target point; deciding whether to stop the autonomous mobile device based on the pose difference; after stopping the autonomous mobile device, re-obtaining the pose of the target point through the sensor system; and correcting a pose error of the autonomous mobile device based on the re-obtained pose of the target point. The pose error includes at least one of a lateral error, a longitudinal error, and an angle error.

In some implementations of the first aspect, the motion control parameter includes a linear velocity and an angular velocity. The determining of the motion control parameters based on the pose of the target point includes: determining the linear velocity; calculating a current curvature based on a current distance between the autonomous mobile device and the target point, a current orientation of the autonomous mobile device, and a current orientation of the target point; and calculating the angular velocity based on the linear velocity and the current curvature.

In some implementations of the first aspect, the autonomous mobile device includes a Non-Omnidirectional Drive system.

A second aspect of the present disclosure provides an autonomous mobile device, including a drive system and a controller coupled to the drive system. The controller is configured to obtain a pose of the target point; determine a motion control parameter based on the pose of the target point; and control the autonomous mobile device to move along a motion trajectory according to multiple motion control parameters including the motion control parameter. A path curvature of the motion trajectory includes an inverse proportional function of a distanIe between the autonomous mobile device and the target point, a coefficient of the inverse proportional function includes a term which is functionally related to a lateral offset between the autonomous mobile device and the target point, and the lateral offset is associated with an orientation of the target point.

In some implementations of the second aspect, the lateral offset is further associated with a position of the autonomous mobile device.

In some implementations of the second aspect, the obtaining of the pose of the target point includes: obtaining multiple target poses of the target point at multiple time points through the sensor system; and calculating a weighted average of the multiple target poses to obtain the current target pose; and calculating the current relative pose between the target point and the autonomous mobile device based on the current target pose.

In some implementations of the second aspect, the obtaining of the multiple target poses of the target point at multiple time points through a sensor system includes: detecting the target point through the sensor system to obtain a sensing result; and transforming the sensing result into an odometry coordinate system to obtain one of the target poses.

In some implementations of the second aspect, the controller is further configured to: detect a motion of the autonomous mobile device through the sensor system; calculate a current device pose of the autonomous mobile device in the odometry coordinate system based on the motion; and calculate a current relative pose between the target point and the autonomous mobile device based on the current target pose and the current device pose.

In some implementations of the second aspect, the multiple target poses at multiple time points include a first target pose at a first time point, the first target pose is detected and obtained by a camera on the autonomous mobile device, and a weight corresponding to the first target pose is negatively correlated with a velocity of the autonomous mobile device at the first time point.

In some implementations of the second aspect, the multiple target poses at multiple time points include a first target pose at a first time point, the first target pose is detected and obtained by an optical radar on the autonomous mobile device, and a weight corresponding to the first target pose is negatively correlated with a distance between the target point and the autonomous mobile device.

In some implementations of the second aspect, the method further including: determine a pose difference between the autonomous mobile device and the target point; decide whether to stop the autonomous mobile device based on the pose difference; after stopping the autonomous mobile device, re-obtain the pose of the target point through the sensor system; and correct a pose error of the autonomous mobile device based on the re-obtained pose of the target point. The pose error includes at least one of a lateral error, a longitudinal error, or an angle error.

In some implementations of the second aspect, the motion control parameter includes a linear velocity and an angular velocity. The determining of the motion control parameters based on the pose of the target point includes: determining the linear velocity; calculating a current curvature based on a current distance between the autonomous mobile device and the target point, a current orientation of the autonomous mobile device, and a current orientation of the target point; and calculating the angular velocity based on the linear velocity and the current curvature.

In some implementations of the second aspect, the drive system includes a Non-Omnidirectional Drive system.

Based on the above, the autonomous mobile device and its control method provided in the implementation of the present disclosure may more quickly correct the lateral offset between itself and the target point by adjusting the algorithms used in path calculation, enhancing the smoothness and efficiency of alignment between the autonomous mobile device and the target point. In addition, by performing coordinate transformations and averaging on the data obtained by the sensor system at multiple time points, it may effectively address the stability issues caused by the insufficient stability of the sensor system.

BRIEF DESCRIPTION OF THE DRAWINGS

FIG. 5 illustrates a flowchart for obtaining a pose of a target point in accordance with an example implementation of the present disclosure.

FIG. 6 illustrates a flowchart of a pose error correction in accordance with an example implementation of the present disclosure.

DETAILED DESCRIPTION

Figure 1:
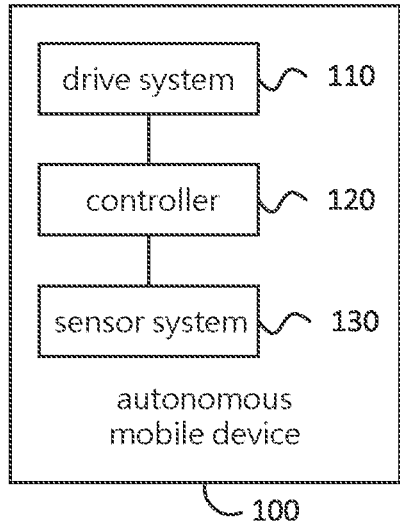
FIG. 1 illustrates a block diagram of an autonomous mobile device in accordance with an example implementation of the present disclosure.

The following description contains specific information pertaining to exemplary implementations in the present disclosure. The drawings in the present disclosure and their accompanying detailed description are directed to merely exemplary implementations. However, the present disclosure is not limited to merely these exemplary implementations. Other variations and implementations of the present disclosure will occur to those skilled in the art. Unless noted otherwise, like or corresponding elements among the figures may be indicated by like or corresponding reference numerals. Moreover, the drawings and illustrations in the present disclosure are generally not to scale, and are not intended to correspond to actual relative dimensions.

For the purpose of consistency and ease of understanding, like features are identified (although, in some examples, not shown) by numerals in the example figures. However, the features in different implementations may be differed in other respects, and thus shall not be narrowly confined to what is shown in the figures.

References to "one implementation," "an implementation," "example implementation," "various implementations," "some implementations," "implementations of the present application," etc., may indicate that the implementation(s) of the present application so described may include a particular feature, structure, or characteristic, but not every possible implementation of the present application necessarily includes the particular feature, structure, or characteristic. Further, repeated use of the phrase "in one implementation," or "in an example implementation," "an implementation," do not necessarily refer to the same implementation, although they may. Moreover, any use of phrases like "implementations" in connection with "the present application" are never meant to characterize that all implementations of the present application must include the particular feature, structure, or characteristic, and should instead be understood to mean "at least some implementations of the present application" includes the stated particular feature, structure, or characteristic. The term "coupled" is defined as connected, whether directly or indirectly through intervening components, and is not necessarily limited to physical connections. The term "comprising," when utilized, means "including, but not necessarily limited to"; it specifically indicates open-ended inclusion or membership in the so-described combination, group, series and the equivalent.

Additionally, for the purposes of explanation and non-limitation, specific details, such as functional entities, techniques, protocols, standard, and the like are set forth for providing an understanding of the described technology. In other examples, detailed description of well-known methods, technologies, system, architectures, and the like are omitted so as not to obscure the description with unnecessary details.

The terms "first," "second," and "third," etc. used in the specification and the accompanying drawings of the present disclosure are intended to distinguish between different objects, rather than to describe a particular order. In addition, the term "comprising" and any variations thereof are intended to cover non-exclusive inclusion. For example, a process, method, system, product, or apparatus that includes a series of steps or modules is not limited to the listed steps or modules but may optionally include additional steps or modules not listed, or optionally include additional steps or modules inherent in such processes, methods, products, or apparatus.

The following description is provided in conjunction with the accompanying drawings to illustrate implementations of the present disclosure.

In some implementations of the present disclosure, control methods for autonomous mobile devices will be illustrated using the example of movement in a two-dimensional plane. However, the present disclosure does not limit the applicability of the control methods to a specific dimension of movement. Those skilled in the art should understand that based on the disclosed content of the implementations, the control methods may be applied to the movement of autonomous mobile devices in three-dimensional space.

FIG. 1 illustrates a block diagram of an autonomous mobile device in accordance with an example implementation of the present disclosure.

Referring to FIG. 1, the autonomous mobile device 100 may include a drive system 110 and a controller 120, where the drive system 110 may be coupled to the controller 120. Specifically, the autonomous mobile device 100 may be a device capable of autonomously moving in an environment, such as Unmanned Aerial Vehicles (UAVs), Autonomous Guided Vehicles (AGVs), Autonomous Guided Forklifts (AGFs), Autonomous Mobile Robots (AMRs), etc., but the present disclosure is not limited to the examples provided herein.

The drive system 110 may be a system configured to move the autonomous mobile device 100. The drive system 110 may include, for example, mechanical structures such as motors, wheels, or tracks.

In some implementations, the drive system 110 may include a Non-Omnidirectional Drive system. Specifically, unlike Omnidirectional Drive systems, such as Mecanum Wheel Drive systems, a Non-Omnidirectional Drive system can move linearly along a forward or backward path and change direction(s) through steering rather than a lateral movement. For instance, Non-Omnidirectional Drive systems include Differential Drive systems, Steered Wheel systems, Tracked Drive systems, Fixed-Axle Drive systems, and others, but the present disclosure is not limited to the examples provided herein.

In some implementations, the drive system 110 of the autonomous mobile device 100 may be a Differential Drive system.

The controller 120 may be configured to control the overall operation of the autonomous mobile device 100. The controller 120 may include, for example, a Central Processing Unit (CPU), or other programmable general-purpose or special-purpose microprocessors, Digital Signal Processors (DSP), programmable controllers, Application-Specific Integrated Circuits (ASIC), Programmable Logic Devices (PLD), or a combination of these components, but the present disclosure is not limited to the examples provided herein.

In some implementations, the autonomous mobile device 100 may also include a sensor system 130 coupled to the controller 120.

In some implementations, the sensor system 130 may include a first sensor system and a second sensor system. Specifically, the first sensor system may be configured to sense the external environment of the autonomous mobile device 100, while the second sensor system may be configured to detect the movement of the autonomous mobile device 100.

For example, the first sensor system may include sensors, such as optical radar and camera for detecting the position and orientation of a target point, and the second sensor system may include sensors, such as wheel speedometers and an Inertial Measurement Unit (IMU) configured to detect changes in the pose of the autonomous mobile device 100.

It is worth mentioning that, in this context, "pose" includes both position information (e.g., coordinates) and orientation information (e.g., pose angles).

Figure 2:
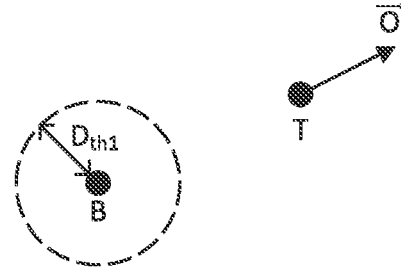
FIG. 2 illustrates a schematic diagram of a task stage in accordance with an example implementation of the present disclosure.

FIG. 2 illustrates a schematic diagram of a task stage in accordance with an example implementation of the present disclosure.

Referring to FIG. 2, in some implementations, task stages of the autonomous mobile device 100 may include a navigation stage and a docking stage.

Specifically, the navigation stage may be a stage where the autonomous mobile device 100 moves from a starting point A to a location B. The docking stage may be a stage where the autonomous mobile device 100 precisely aligns with a target point T in the vicinity of the location B after moving to the location B. For example, during the navigation stage, the autonomous mobile device 100 may use threshold values, including a first distance threshold $D_{th1}$, as criteria to determine whether the autonomous mobile device 100 has reached the location B. In the docking stage, the autonomous mobile device 100 may use threshold values, including the second distance threshold (not shown in FIG. 2), as criteria to determine whether the autonomous mobile device 100 has accurately docked to the target point T. Since docking requires higher precision, the second distance threshold may be less than or equal to the first distance threshold $D_{th1}$.

In some implementations, the target point T may include not only location information but also information about the orientation $\vec{O}$. For example, the starting point A may be a first workstation in a factory, the location B may be a second workstation in the factory, and the target point T may be a directional location within the second workstation, where the autonomous mobile device 100 is parked or aligned.

It is worth mentioning that in the following implementations, the control of the autonomous mobile device 100 during the docking stage is to illustrate the control method provided in the present disclosure. However, those skilled in the art should understand that the control method disclosed herein can also be applied to other task stages.

Figure 3:
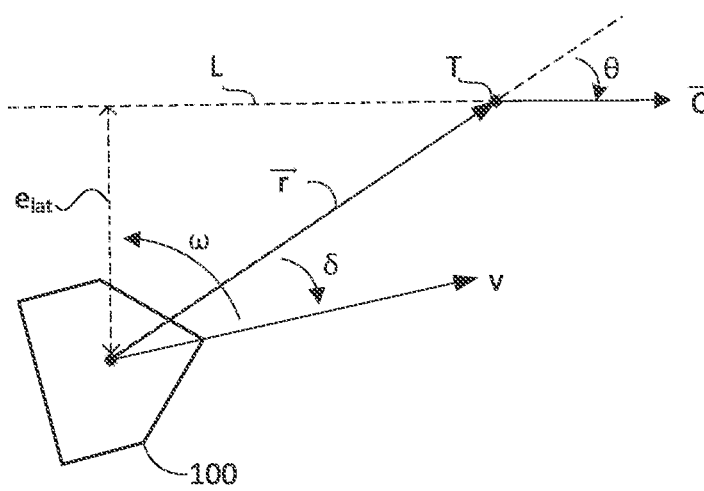
FIG. 3 illustrates a schematic diagram of a control method in accordance with an example implementation of the present disclosure.
Figure 4:
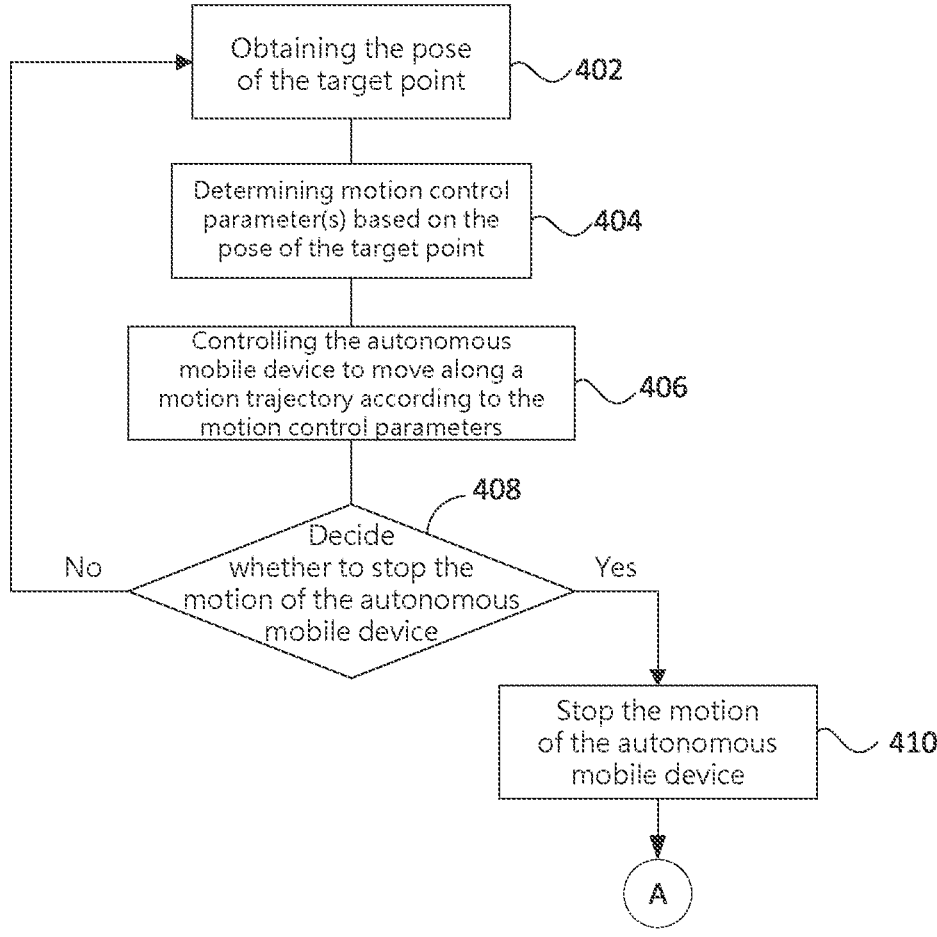
FIG. 4 illustrates a flowchart of a control method in accordance with an example implementation of the present disclosure.

FIG. 3 illustrates a schematic diagram of a control method in accordance with an example implementation of the present disclosure; FIG. 4 illustrates a flowchart of a control method in accordance with an example implementation of the present disclosure. The parameters and labels shown in FIG. 3 will be used in the description of the implementations of the control method.

Referring to FIGS. 3 and 4, in action 402, the controller 120 may obtain a pose of the target point T. Specifically, the pose of the target point T may include at least one of a positional information and an orientation information of the target point T.

In some implementations, the controller 120 may be coupled to at least one memory (not shown). The at least one memory may be configured to store an environmental map and the pose of at least one reference point on the environmental map. When the target point T corresponds to one of the at least one reference point, the controller 120 may obtain the pose of the target point T from the information in the at least one memory.

In some implementations, the controller 120 may obtain the pose of the target point T through the sensor system 130. Specifically, the sensor system 130 on the autonomous mobile device 100 may be configured to detect the target point T to obtain the pose of the target point T relative to the autonomous mobile device 100.

In some implementations, to avoid path roughness caused by the instability of the sensor system 130, the controller 120 may process the sensing result(s), obtained by the sensor system 130 when detecting the target point T through computation, before providing them for subsequent motion control.

FIG. 5 illustrates a flowchart of obtaining a pose of a target point in accordance with an example implementation of the present disclosure.

Referring to FIG. 5, in action 502, the controller 120 may obtain multiple target poses of the target point T at multiple time points through the sensor system 130.

Specifically, starting from the initial position (e.g., the location B), the sensor system 130 may detect the target point T at multiple time points to obtain multiple sensing results. These sensing results may be presented in an egocentric coordinate system, and the controller 120 may transform these sensing results to a same absolute coordinate system to obtain multiple target poses.

For example, the sensor system 130 may include a camera with a first update rate (e.g., 60 Hz). At each time point (e.g., every ¹⁄₆₀ second), the sensor system 130 may obtain the pose of the target point T based on the environmental images captured by the camera. For instance, the sensor system 130 may include an optical radar with a second update rate (e.g., 20 Hz, typically ranging from 10 to 30 Hz). At each time point (e.g., every ¹⁄₂₀ second), the sensor system 130 may obtain the pose of the target point T based on the environmental images detected by the optical radar.

For example, the controller 120 may transform multiple sensing results obtained by the first sensor system, based on the self-pose changes obtained by the second sensor system and the intrinsic parameters of the first sensor system, to the same absolute coordinate system.

In some implementations, the controller 120 may decide an absolute coordinate system with the initial position as the origin and transform the poses of the target point T that are obtained through the sensor system 130 at multiple time points to this absolute coordinate system, thus obtaining multiple target poses of the target point T at multiple time points. For example, the decided absolute coordinate system may be an odometry coordinate.

In action 504, the controller 120 may calculate a weighted average of multiple target poses to obtain the current target pose.

Specifically, the current target pose may include at least one of a current target position and a current target orientation. For example, the controller 120 may calculate the weighted average of multiple target positions of the target point T at multiple time points to obtain the current target position. For example, the controller 120 may calculate the weighted average of the multiple target orientations of the target point T at multiple time points to obtain the current target orientation.

In some implementations, the weights used for calculating the weighted average may be all the same (e.g., 1).

In some implementations, the weights used for calculating the weighted average may be related (e.g., positively correlated) to the data reliability of the corresponding target poses. For example, the data reliability of the camera may be negatively correlated with the camera's movement speed. For example, the data reliability of the optical radar may be negatively correlated with the distance between the optical radar and the target point T.

In some implementations, the multiple weights in calculating the weighted average of the multiple target poses detected and obtained through the camera of the sensor system 130 may be negatively correlated with the speed of the autonomous mobile device 100 when the camera captures the multiple target poses. For example, the multiple target poses detected and obtained through the camera may include a first target pose at a first time point and a second target pose at a second time point. In a case that the speed of the autonomous mobile device 100 is higher at the first time point than at the second time point, the weight corresponding to the first target pose may be smaller than the weight corresponding to the second target pose.

In some implementations, the multiple weights in calculating the weighted average of the multiple target poses detected and obtained through the optical radar of the sensor system 130 may be negatively correlated with the distance between the autonomous mobile device 100 and the target point T when the optical radar captures the multiple target poses. For example, the multiple target poses detected and obtained through the optical radar may include a first target pose at a first time point and a second target pose at a second time point. In a case that the distance between the autonomous mobile device 100 and the target point T is greater at the first time point than at the second time point, the weight corresponding to the first target pose may be smaller than the weight corresponding to the second target pose.

In some implementations, the current target pose that has already undergone a weighted averaging may be used for subsequent motion control. Advantageously, the weighted average calculation may correct the instability of the detection/sensing results for the target point T of the sensor system 130.

In action 506, the controller 120 may calculate a current relative pose between the target point T and the autonomous mobile device 100 based on the current target pose.

Specifically, the current relative pose may be a pose represented in the egocentric coordinate system. Since the current target pose may be in the odometry coordinate system, the controller 120 may first transform the current target pose of the target point T back to the egocentric coordinate system for subsequent motion control.

In some implementations, the initial pose of the controller 120 may be the origin of the odometry coordinate system. Therefore, based on the motion (e.g., self-pose changes) detected by the sensor system 130 from the initial pose of the autonomous mobile device 100 to a current time, the controller 120 may calculate a current device pose of the autonomous mobile device 100 in the odometry coordinate system at the current time. After obtaining the information of the current device pose of the autonomous mobile device 100 in the odometry coordinate system and the current target pose of the target point T, the controller 120 may calculate the current relative pose between the target point T and the autonomous mobile device 100. In other words, the current relative pose may be the current pose of the target point T in the egocentric coordinate system of the autonomous mobile device 100.

Returning to FIG. 4, in action 404, the controller 120 may determine motion control parameter(s) based on the pose of the target point T. In action 406, the controller 120 may control the autonomous mobile device 100 to move along a motion trajectory based on the motion control parameter(s).

Specifically, the controller 120 may determine motion control parameter(s) to make the path curvature of the motion trajectory include an inverse proportional function of the distance $\vec{r}$ between the autonomous mobile device 100 and the target point T. A coefficient of the inverse proportional function may include a term which is functionally related to the lateral offset $e_{lat}$ between the autonomous mobile device 100 and the target point T. The motion control parameter(s) for controlling the drive system 110 of the autonomous mobile device 100 may include a linear velocity and an angular velocity, but the present disclosure is not limited to the examples provided herein.

Specifically, the lateral offset $e_{lat}$ between the autonomous mobile device 100 and the target point T may be associated with the orientation $\vec{O}$ of the target point T. More specifically, the lateral offset $e_{lat}$ may be used to measure the deviation between the position of the autonomous mobile device 100 and the orientation $\vec{O}$ of the target point T. Therefore, the lateral offset $e_{lat}$ between the autonomous mobile device 100 and the target point T may be further associated with the position of the autonomous mobile device 100.

In some implementations, the lateral offset $e_{lat}$ may be associated with the angle $\theta$ between the line connecting the autonomous mobile device 100 and the target point T and the orientation $\vec{O}$ of the target point T. For example, the lateral offset $e_{lat}$ may be associated with $\theta$. For example, the lateral offset $e_{lat}$ may be associated with sin $\theta$.

In some implementations, as shown in FIG. 3, the lateral offset $e_{lat}$ between the autonomous mobile device 100 and the target point T may be the distance from the autonomous mobile device 100 to line L, where the line L passes through the target point T and is parallel to the orientation $\vec{O}$ of the target point T.

In some implementations, the path curvature k of the motion trajectory may be represented by the following equation (1):

$$\kappa = -\frac{1}{\|\vec{r}\|}[f_1(\delta, \theta) + f_2(e_{lat})] \tag{1}$$

In equation (1), $\vec{r}$ may be a vector pointing from the autonomous mobile device 100 to the target point T; $\|\vec{r}\|$ may be the distance from the autonomous mobile device 100 to the target point T (referred to as r for simplicity); $\delta$ may be the angle from $\vec{r}$ to the orientation of the autonomous mobile device 100; $\theta$ may be the angle from $\vec{r}$ to the orientation of the target point T.

In equation (1), the function $f_1(\delta, \theta)$ may be determined based on the adopted motion control law, those skilled in the art may implement the function $f_1(\delta, \theta)$ based on requirements, the example implementations disclosed herein do not limit the specific motion control laws adopted.

Specifically, in equation (1), the coefficient $[f_1(\delta, \theta)+f_2(e_{lat})]$ of the inverse proportional function $$-\frac{1}{\|\vec{r}\|}[f_1(\delta, \theta) + f_2(e_{lat})]$$

may include a term $f_2(e_{lat})$ functionally related to the lateral offset $e_{lat}$ between the autonomous mobile device 100 and the target point T. In some examples, the term $f_2(e_{lat})$ may be a function that is positively correlated with the lateral offset $e_{lat}$. In some examples, the term $f_2(e_{lat})$ may be a function that is proportional to the lateral offset $e_{lat}$, for example, $k*e_{lat}$, where the constant k is a positive value.

In some implementations, the path curvature $\kappa$ of the motion trajectory may be determined by a motion control law based on Lyapunov function. For example, in the case of FIG. 3, the motion of the autonomous mobile device 100 may be represented by the following equation (2):

$$\begin{pmatrix} \dot{r} \\ \dot{\theta} \\ \dot{\delta} \end{pmatrix} \begin{pmatrix} -v\cos\delta \\ \frac{v}{r}\sin\delta \\ \frac{v}{r}\sin\delta + \omega \end{pmatrix} \tag{2}$$

In equation (2), the dot symbol is configured to represent a derivative with respect to time.

According to the motion control law (e.g., the motion control law presented by Jong Jin Park and Benjamin Kuipers in the paper "A Smooth Control Law for Graceful Motion of Differential Wheeled Mobile Robots in 2D Environment," published at the 2011 IEEE International Conference on Robotics and Automation), starting from the motion of the autonomous mobile device 100 ((e.g., equation (2)), based on a Lyapunov function candidate V given by the following equation (3) and a virtual control parameter δ given by the following equation (4), the control law for the angular velocity ω may be expressed as the following equation (5):

$$V = \frac{1}{2}\left(r^2 + \theta^2\right) \tag{3}$$

$$\delta = \tan^{-1}(-k_1\theta) \tag{4}$$

$$\omega = -\frac{v}{r}\left[k_2 z + \left(1 + \frac{k_1}{1 + (k_1\theta)^2}\right)\sin\!\left(z + \tan^{-1}(-k_1\theta)\right)\right] \tag{5}$$

In equations (3) to (5), z may be defined as $\delta - \tan^{-1}(-k_1\theta)$, and $k_1$, $k_2$ may be constants.

To enhance the smoothness of the alignment between the autonomous mobile device 100 and the target point T (e.g., at the docking stage), the implementations of the present disclosure ensure that the coefficient of the inverse proportional function serving as the path curvature includes a term functionally related to the lateral offset $e_{lat}$. Therefore, the above equation (5) may be adjusted to the following equation (6):

$$\omega = -\frac{v}{r}\left[k_2 z + \left(1 + \frac{k_1}{1 + (k_1\theta)^2}\right)\sin\!\left(z + \tan^{-1}(-k_1\theta)\right) + k_3 e_{lat}\right] \tag{6}$$

In equation (6), $e_{lat}$ may be the lateral offset between the autonomous mobile device 100 and the target point T, and $k_3$ may be a constant.

Since the angular velocity ω is a linear function of linear velocity v (e.g., $\omega = \kappa(r, \theta, \delta)*v$), the path curvature κ may be determined based on the equation (6) to obtain the following equation (7).

$$\kappa = -\frac{1}{r}\left[k_2 z + \left(1 + \frac{k_1}{1 + (k_1\theta)^2}\right)\sin\!\left(z + \tan^{-1}(-k_1\theta)\right) + k_3 e_{lat}\right] \tag{7}$$

Based on the above content, when determining motion control parameter(s), the controller 120 may determine the linear velocity v. It is worth mentioning that the present disclosure does not limit the manner in which the linear velocity v is determined, those skilled in the art can implement it based on appropriate requirements. In some examples, the linear velocity v may be determined as a constant value. In some examples, the linear velocity v may be a function of the distance between the autonomous mobile device 100 and the target point T and may be determined based on the current relative pose.

When determining the motion control parameter(s), the controller 120 may, for example, calculate a current curvature based on the path curvature that is derived from the motion control law.

For example, the controller 120 may obtain a current distance between the autonomous mobile device 100 and the target point T (for example, but not limited to, based on the current relative pose as described above), a current orientation of the autonomous mobile device 100 (for example, but not limited to, based on the current device pose as described above), and a current orientation of the target point T (for example, but not limited to, based on the current relative pose and/or the current device pose as described above) through the sensor system 130. Then, the controller 120 may calculate the current curvature using the path curvature that is derived from the motion control law (for example, but not limited to, equation (1) or equation (7) above).

When determining the motion control parameter(s), the controller 120 may calculate, according to a linear function (e.g., $\omega = \kappa*v$) relationship between the angular velocity and the linear velocity, the angular velocity that is based on the linear velocity and the current curvature obtained before.

Based on the determined motion control parameter(s) for the autonomous mobile device 100, the controller 120 may control the drive system 110 to control the autonomous mobile device 100 to move along the motion trajectory.

Returning to FIG. 4, in action 408, the controller 120 may decide whether to stop the motion of the autonomous mobile device 100. In a case that the controller 120 decides to stop the motion of the autonomous mobile device 100, the process may proceed to action 410; otherwise, in a case that the controller 120 decides not to stop the motion of the autonomous mobile device 100, the process may return to action 402.

In some implementations, the controller 120 may determine whether the autonomous mobile device 100 has completed alignment with the target point T. In a case that the alignment is completed, the process may proceed to action 410 to stop the motion of the autonomous mobile device 100; otherwise, in a case that the alignment is not completed, the controller 120 may not stop the motion of the autonomous mobile device 100 and the process may return to action 402.

Specifically, the controller 120 may determine a pose difference between the autonomous mobile device 100 and the target point T, and may determine whether the alignment is complete and decide whether to stop the autonomous mobile device 100 based on the pose difference. For example, the controller 120 may set a distance threshold. In a case that the current distance between the autonomous mobile device 100 and the target point T is less than or equal to the set distance threshold (for example, but not limited to, based on the current relative pose as described above), the controller 120 may determine that the alignment is complete and stop the autonomous mobile device 100. For example, the controller 120 may set a distance threshold and an angle threshold. In a case that the current distance between the autonomous mobile device 100 and the target point T is less than or equal to the set distance threshold, and the angle between the orientation of the autonomous mobile device 100 and the orientation of the target point T is less than or equal to the set angle threshold (for example, but not limited to, based on the current relative pose as described above), the controller 120 may determine that the alignment is complete and stop the autonomous mobile device 100.

It is worth mentioning that after stopping the autonomous mobile device 100, since the speed of the autonomous mobile device 100 is zero and the autonomous mobile device 100 is closer to the target point T, obtaining the pose of the target point T again through the sensor system 130 (e.g., including a camera and/or optical radar) may be done with higher accuracy.

FIG. 6 illustrates a flowchart of a pose error correction in accordance with an example implementation of the present disclosure.

In some implementations, after stopping the autonomous mobile device 100 in action 410, in action 602, the controller 120 may re-obtain the pose of the target point T through the sensor system 130. For example, the controller 120 may use the approach described in the implementation of FIG. 5 to re-obtain the pose of the target point T within a preset time (for example, but not limited to, 10 seconds) after stopping the autonomous mobility device 100. For example, during the process of re-obtaining the pose of the target point T, the data of the pose of the target point T that are obtained before the autonomous mobile device 100 has stopped may not be taken into consideration.

Advantageously, the pose of the target point T that is re-obtained in action 602 may have higher accuracy, making it suitable for further correcting the pose error in alignment between the autonomous mobile device 100 and the target point T.

In action 604, the controller 120 may correct the pose error of the autonomous mobile device 100 based on the re-obtained pose of the target point T.

Figure 7A:
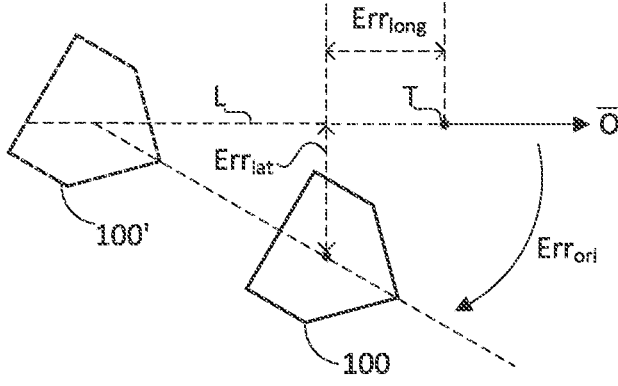
FIGS. 7A to 7C illustrate schematic diagrams of a pose error correction in accordance with an example implementation of the present disclosure.
Figure 7B:
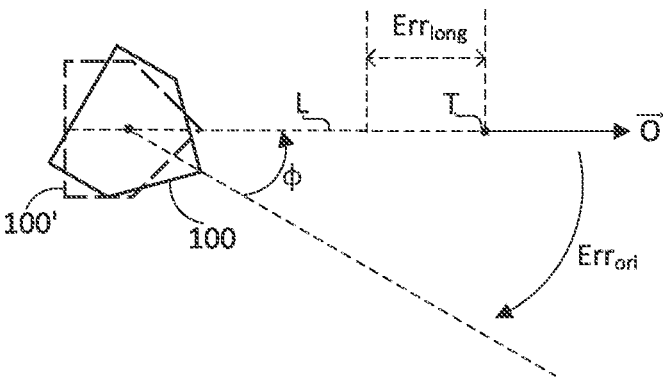
Figure 7C:
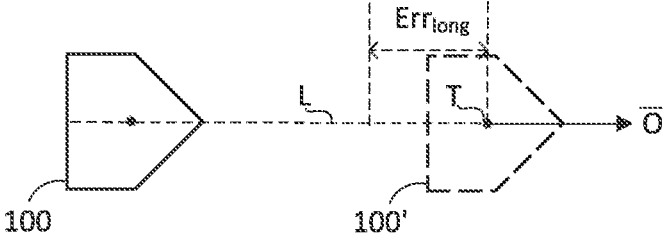

FIG. 7A to 7C illustrate schematic diagrams of a pose error correction in accordance with an example implementation of the present disclosure.

Referring to FIG. 7A, the pose error between the autonomous mobile device 100 and the target point T may include at least one of a lateral error $ERR_{lat}$, a longitudinal error $ERR_{long}$, and an angle error $ERR_{ori}$.

Specifically, the lateral error $ERR_{lat}$ may be a distance from the autonomous mobile device 100 to line L, where the line L may pass through the target point T and parallel to the orientation $\vec{O}$ of the target point T.

Specifically, the longitudinal error $ERR_{long}$ may be a distance between the autonomous mobile device 100 and the target point T after the autonomous mobile device 100 has moved along the lateral error $ERR_{lat}$ to the line L.

Specifically, the angular error $ERR_{ori}$ may be an angle between the orientation of the autonomous mobile device 100 and the orientation of the target point T.

It should be mentioned that the present disclosure does not limit the specific correction approach for pose error correction, and those skilled in the art may design it based on requirements.

Referring to FIGS. 7A to 7C, in some examples, based on the approach of the implementations illustrated with FIG. 5, the autonomous mobile device 100 may first correct the lateral error $ERR_{lat}$ (as shown in FIG. 7A, the autonomous mobile device 100 may move in a straight line to align with line L, becoming an autonomous mobile device 100') based on the obtained information (for example, but not limited to, the current device pose and/or the current relative pose), then the correct angular error $Err_{ori}$ (as shown in FIG. 7B, the autonomous mobile device 100 may rotate by an angle $\phi=Err_{ori}$ to align with the orientation of the target point T, becoming the autonomous mobile device 100'), and finally correct the longitudinal error $ERR_{long}$ (as shown in FIG. 7C, the autonomous mobile device 100 may move along the straight line L to reach the target point T, becoming the autonomous mobile device 100').

In summary, the autonomous mobile device and its control method provided in the implementations of the present disclosure may correct the lateral offset between the autonomous mobile device and the target point quicker by adjusting the algorithms used in path calculation, enhancing the smoothness and efficiency of alignment between the autonomous mobile device and the target point. In addition, by performing coordinate transformations and averaging on the data obtained by the sensor system at multiple time points, the control method may effectively address the stability issues that are caused by the insufficient stability of sensor system. Furthermore, the implementations of the present disclosure may further correct errors by leveraging the inherent features of the sensor system after the alignment is complete and stops, thereby enhancing precision.

Based on the above description, it is apparent that various techniques can be configured to implement the concepts described in this application without departing from their scope. Furthermore, although certain implementations have been specifically described and illustrated, those skilled in the art will recognize that variations and modifications can be made in form and detail without departing from the scope of the concepts. Thus, the described implementations are to be considered in all respects as illustrative and not restrictive. Moreover, it should be understood that this application is not limited to the specific implementations described above, but many rearrangements, modifications, and substitutions can be made within the scope of the present disclosure.

What is claimed is:

1. A control method for an autonomous mobile device, the method comprising:
   obtaining a pose of a target point comprising:
      obtaining a plurality of target poses of the target point at a plurality of time points through a sensor system, the plurality of target poses at the plurality of time points comprising a first target pose at a first time point, and the first target pose being detected and obtained by an optical radar on the autonomous mobile device; and
      calculating a weighted average of the plurality of target poses to obtain a current target pose, a weight corresponding to the first target pose being negatively correlated with a distance between the target point and the autonomous mobile device;
   determining one or more motion control parameters based on the pose of the target point; and
   controlling the autonomous mobile device to move along a motion trajectory based on the one or more motion control parameters,
   wherein a path curvature of the motion trajectory comprises an inverse proportional function of a distance between the autonomous mobile device and the target point, a coefficient of the inverse proportional function comprises a term functionally related to a lateral offset between the autonomous mobile device and the target point, and the lateral offset is associated with an orientation of the target point.

2. The method of claim 1, wherein the lateral offset is further associated with a position of the autonomous mobile device.

3. The method of claim 1, wherein obtaining of the plurality of target poses of the target point at the plurality of time points through the sensor system comprises:
   detecting the target point through the sensor system to obtain a sensing result; and
   transforming the sensing result into an odometry coordinate system to obtain one of the plurality of target poses.

4. The method of claim 3, further comprising:
   detecting a motion of the autonomous mobile device through the sensor system;
   calculating a current device pose of the autonomous mobile device in the odometry coordinate system based on the motion; and
   calculating a current relative pose between the target point and the autonomous mobile device based on the current target pose and the current device pose.

5. The method of claim 1, wherein the plurality of target poses at the plurality of time points comprises a second target pose at a second time point, the second target pose is detected and obtained by a camera on the autonomous mobile device, and a weight corresponding to the second target pose is negatively correlated with a velocity of the autonomous mobile device at the second time point.

6. The method of claim 1, further comprising:
determining a pose difference between the autonomous mobile device and the target point;
deciding whether to stop the autonomous mobile device based on the pose difference;
after stopping the autonomous mobile device, re-obtaining the pose of the target point through the sensor system; and
correcting a pose error of the autonomous mobile device based on the re-obtained pose of the target point, wherein the pose error comprises at least one of a lateral error, a longitudinal error, and an angle error.

7. The method of claim 1, wherein the one or more motion control parameters comprise a linear velocity and an angular velocity, and determining the one or more motion control parameters based on the pose of the target point comprises:
determining the linear velocity;
calculating a current curvature based on a current distance between the autonomous mobile device and the target point, a current orientation of the autonomous mobile device, and a current orientation of the target point; and
calculating the angular velocity based on the linear velocity and the current curvature.

8. The method of claim 1, wherein the autonomous mobile device comprises a Non-Omnidirectional Drive system.

9. An autonomous mobile device, comprising:
a sensor system;
a drive system; and
a controller coupled to the sensor system and the drive system, and configured to:
obtain a pose of the target point comprising:
obtaining a plurality of target poses of the target point at a plurality of time points through the sensor system, the plurality of target poses at the plurality of time points comprising a first target pose at a first time point, and the first target pose being detected and obtained by an optical radar on the autonomous mobile device; and
calculating a weighted average of the plurality of target poses to obtain a current target pose, a weight corresponding to the first target pose being negatively correlated with a distance between the target point and the autonomous mobile device;
determine one or more motion control parameters based on the pose of the target point; and
control the autonomous mobile device to move along a motion trajectory based on the one or more motion control parameters,
wherein a path curvature of the motion trajectory comprises an inverse proportional function of a distance between the autonomous mobile device and the target point, a coefficient of the inverse proportional function comprises a term functionally related to a lateral offset between the autonomous mobile device and the target point, and the lateral offset is associated with an orientation of the target point.

10. The autonomous mobile device of claim 9, wherein the lateral offset is further associated with a position of the autonomous mobile device.

11. The autonomous mobile device of claim 9, wherein obtaining of the plurality of target poses of the target point at the plurality of time points through the sensor system comprises:
detecting the target point through the sensor system to obtain a sensing result; and
transforming the sensing result into an odometry coordinate system to obtain one of the plurality of target poses.

12. The autonomous mobile device of claim 11, wherein the controller is further configured to:
detect a motion of the autonomous mobile device through the sensor system;
calculate a current device pose of the autonomous mobile device in the odometry coordinate system based on the motion; and
calculate a current relative pose between the target point and the autonomous mobile device based on the current target pose and the current device pose.

13. The autonomous mobile device of claim 9, wherein the plurality of target poses at the plurality of time points comprises a second target pose at a second time point, the second target pose is detected and obtained by a camera on the autonomous mobile device, and a weight corresponding to the second target pose is negatively correlated with a velocity of the autonomous mobile device at the second time point.

14. The autonomous mobile device of claim 9, wherein the controller is further configured to:
determine a pose difference between the autonomous mobile device and the target point;
decide whether to stop the autonomous mobile device based on the pose difference;
after stopping the autonomous mobile device, re-obtain the pose of the target point through the sensor system; and
correct a pose error of the autonomous mobile device based on the re-obtained pose of the target point, wherein the pose error comprises at least one of a lateral error, a longitudinal error, and an angle error.

15. The autonomous mobile device of claim 9, wherein the one or more motion control parameters comprise a linear velocity and an angular velocity, and determining the one or more motion control parameters based on the pose of the target point comprises:
determining the linear velocity;
calculating a current curvature based on a current distance between the autonomous mobile device and the target point, a current orientation of the autonomous mobile device, and a current orientation of the target point; and
calculating the angular velocity based on the linear velocity and the current curvature.

16. The autonomous mobile device of claim 9, wherein the drive system comprises a Non-Omnidirectional Drive system.

* * * * *